(No Model.)
J. CALDWELL.
HAND TRUCK.
No. 342,950. Patented June 1, 1886.
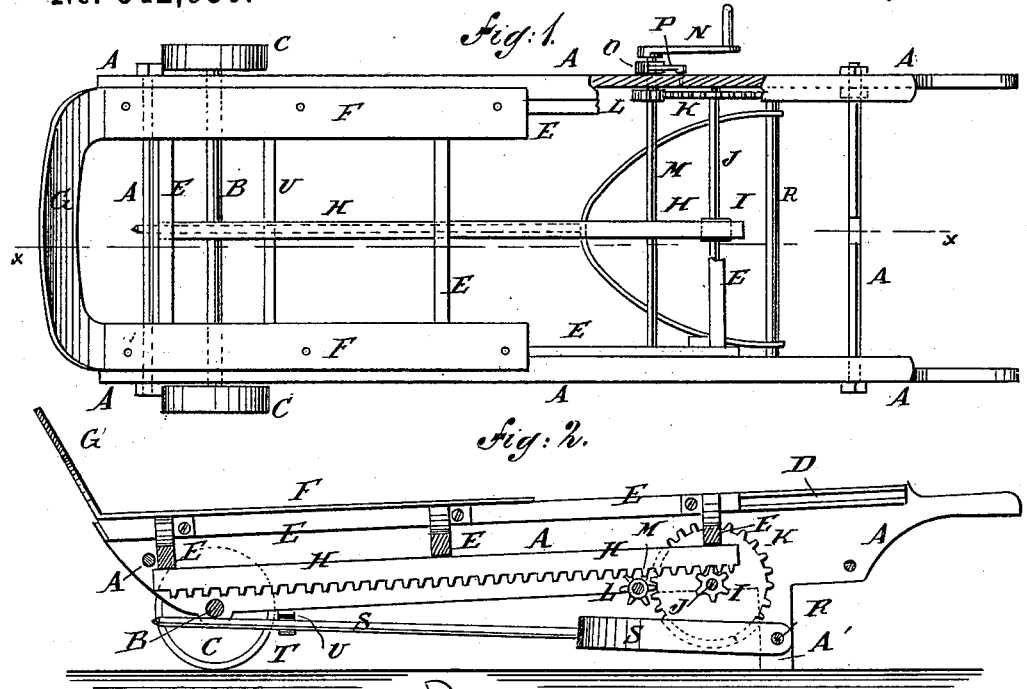
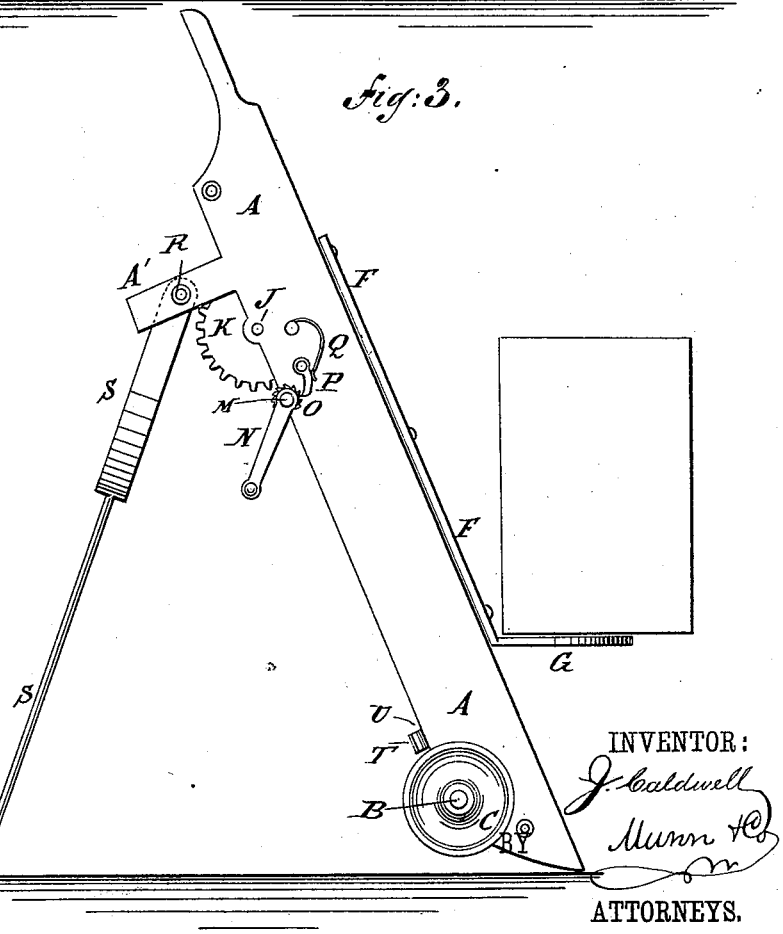
WITNESSES:
Chas Nida
C. Sedgwick
INVENTOR:
J. Caldwell
Munn &Co
ATTORNEYS.

UNITED STATES PATENT OFFICE.

JOHN CALDWELL, OF WILMINGTON, DELAWARE.

HAND-TRUCK.

SPECIFICATION forming part of Letters Patent No. 342,950, dated June 1, 1886.

Application filed June 1, 1885. Serial No. 167,317. (No model.)

*To all whom it may concern:*

Be it known that I, JOHN CALDWELL, residing in Wilmington, in the county of New Castle and State of Delaware, have invented a new and useful Improvement in Hand-Trucks, of which the following is a full, clear, and exact description.

Reference is to be had to the accompanying drawings, forming a part of this specification, in which similar letters of reference indicate corresponding parts in all the figures.

Figure 1 is a plan view of one of my improved trucks, partly in section. Fig. 2 is a sectional side elevation of the same, taken through the line $x\,x$, Fig. 1. Fig. 3 is a side elevation of the same, shown in a raised position and illustrating its use.

The object of this invention is to provide hand-trucks constructed in such a manner that they can be used as elevators for loading boxes, sacks, and other heavy articles into wagons.

The invention consists in the construction and combination of various parts of the truck, as will be hereinafter fully described, and then pointed out in the claims.

A represents the frame of the truck, in the lower part of the rear end of which are formed bearings, in which revolves the shaft B of the wheels C. In the inner sides of the upper part of the frame A are formed grooves D, in which slide the outer edges of the side bars of the frame E. To the lower part of the frame E are attached plates F, to the lower ends of which is attached, or upon them is formed, the toe G, and which overlap the upper edges of the side bars of the frame A, to support the load being carried and keep it out of contact with the said frame A. To the centers of the cross-bars of the frame E is secured a rack-bar, H, the teeth of which mesh into the teeth of a pinion-wheel, I, attached to the center of the shaft J. The shaft J revolves in bearings in the side bars of the frame A, and to it, at the inner side of one of the said side bars, is attached a gear-wheel, K. The teeth of the gear-wheel K mesh into the teeth of the pinion-wheel L, attached to the shaft M, placed parallel with the shaft J and journaled in bearings in the side bars of the frame A. One of the journals of the shaft M projects, and to it is attached a crank, N, by means of which the gearing is operated to raise the frame E and any load that may be placed upon it. To the shaft M is also attached a ratchet-wheel, O, with the teeth of which engages a pawl, P, pivoted to a side bar of the frame A and held against the said ratchet-wheel O by a spring, Q, attached to the said side bar of the frame. The ratchet-wheel and pawl are arranged to hold the gearing from being turned back, and allowing the frame E to descend under the pressure of the load placed upon it.

To the legs A' of the frame A is hinged, by a rod, R, the forked upper end of the long leg S, by which the truck is supported when raised into an inclined position, as illustrated in Fig. 3, so that the crank N can be conveniently operated to raise the frame E F G and the load placed upon it. When the load has been raised to the required height, it will be held in place by the pawl and ratchet-wheel P O, and the load can be placed in a wagon by swinging the upper part of the truck A forward upon the toe as a fulcrum.

When the brace-leg S is not required for use, it is swung against the under side of the frame A, and is held in place by a spring clamp or holder, T, attached to the middle part of the cross-bar U, the ends of which are secured to the side bars of the frame A.

Having thus described my invention, I claim as new and desire to secure by Letters Patent—

1. In a hand-truck, the combination, with the frame A, having grooves D, of the sliding frame E, the plates F on the upper edge of the same, the toe G, secured to or formed on said plates F, the rack-bar H, secured to the under side of the frame E, the shaft J, having a pinion, I, meshing with the rack-bar, and the crank and gearing for operating said shaft J, substantially as set forth.

2. The combination, with the truck-frame A, having the wheels B at its front end and the legs A' at its rear end, of the brace-leg S, forked at its upper end and pivoted to the legs A, the cross-bar U, near the front end of the frame A, and the clamp T, of spring material, secured to the cross-bar U in the path of the leg S, substantially as set forth.

JOHN CALDWELL.

Witnesses:
 DANIEL FARRA,
 WARREN H. FARRA.